United States Patent
Luciano, Jr.

(10) Patent No.: US 8,919,036 B2
(45) Date of Patent: Dec. 30, 2014

(54) TRELLIS SYSTEM FOR IRRIGATION AND FROST PREVENTION

(75) Inventor: Robert A. Luciano, Jr., Reno, NV (US)

(73) Assignee: Edge Technology, Reno, NV (US)

( * ) Notice: Subject to any disclaimer, the term of this patent is extended or adjusted under 35 U.S.C. 154(b) by 722 days.

(21) Appl. No.: 13/082,017

(22) Filed: Apr. 7, 2011

(65) Prior Publication Data

US 2011/0247264 A1 Oct. 13, 2011

Related U.S. Application Data

(60) Provisional application No. 61/322,739, filed on Apr. 9, 2010, provisional application No. 61/322,761, filed on Apr. 9, 2010, provisional application No. 61/322,773, filed on Apr. 9, 2010.

(51) Int. Cl.
*A01G 13/00* (2006.01)
*A01G 17/06* (2006.01)
*A01G 13/06* (2006.01)
*A01G 25/02* (2006.01)

(52) U.S. Cl.
CPC .............. *A01G 13/065* (2013.01); *A01G 17/06* (2013.01); *A01G 25/02* (2013.01)
USPC ............................................................. 47/2

(58) Field of Classification Search
USPC .......................... 47/45, 47, 48.5, 66.6, 70, 82
See application file for complete search history.

(56) References Cited

U.S. PATENT DOCUMENTS

| | | | |
|---|---|---|---|
| 661,898 A | 11/1900 | Tucker | |
| 1,688,802 A | 10/1928 | Crowhurst | |
| 1,758,941 A | 5/1930 | Gibson | |
| 1,846,395 A | 2/1932 | Huffaker | |
| 3,274,769 A | 9/1966 | Reynolds | |
| 3,470,943 A | 10/1969 | Van Huisen | |
| 3,604,728 A | 9/1971 | Blass et al. | |
| 3,755,961 A | 9/1973 | McIsaac | |
| 3,875,699 A * | 4/1975 | Lamarre | 47/46 |
| 3,915,384 A | 10/1975 | Diggs | |
| 4,085,543 A | 4/1978 | Barnard | |
| 4,325,681 A | 4/1982 | Matthews | |
| 4,437,263 A | 3/1984 | Nir et al. | |
| 4,577,435 A | 3/1986 | Springer et al. | |
| 4,742,643 A | 5/1988 | Thompson, Jr. | |
| 4,825,592 A * | 5/1989 | Earls | 47/82 |
| 5,357,710 A * | 10/1994 | Dulik et al. | 47/48.5 |
| 5,364,439 A * | 11/1994 | Gallup et al. | 71/57 |

(Continued)

OTHER PUBLICATIONS

Alzorgan, Mohammad, An Automated System for Irrigation and Frost Protection, Journal of Ubiquitous Systems and Pervasive Networks, (2011) vol. 3, No. 1, pp. 13-17.

*Primary Examiner* — David Parsley
*Assistant Examiner* — Danielle Clerkley
(74) *Attorney, Agent, or Firm* — Michael A. Kerr; Kerr IP Group, LLC

(57) ABSTRACT

A trellis mounted system for irrigation and frost prevention is described. The irrigation system comprises a trellis, a first conduit coupled to the trellis, and a second conduit coupled to the trellis. The first conduit delivers a heated water stream to a nozzle that provides a heated water spray to an area surrounding the trellis. The second conduit provides drip irrigation to a ground area surrounding the trellis. The heated water supplied by the trellis mounted irrigation system prevents the development of damaging frost on agricultural plants.

21 Claims, 13 Drawing Sheets

(56) References Cited

U.S. PATENT DOCUMENTS

| | | | |
|---|---|---|---|
| 5,752,341 A * | 5/1998 | Goldfarb | 47/78 |
| 5,862,625 A * | 1/1999 | Parker | 47/47 |
| 5,881,495 A * | 3/1999 | Clark | 47/48.5 |
| 6,393,764 B1 * | 5/2002 | Smith | 47/65.5 |
| 6,947,810 B2 * | 9/2005 | Skinner | 700/283 |
| 7,941,968 B1 * | 5/2011 | Coyle | 47/45 |
| 8,096,293 B2 | 1/2012 | Holellenriegel et al. | |
| 8,678,706 B2 | 3/2014 | Luciano, Jr. | |
| 2006/0022066 A1 * | 2/2006 | Jerstad | 239/276 |
| 2009/0060659 A1 | 3/2009 | Wallace | |

* cited by examiner

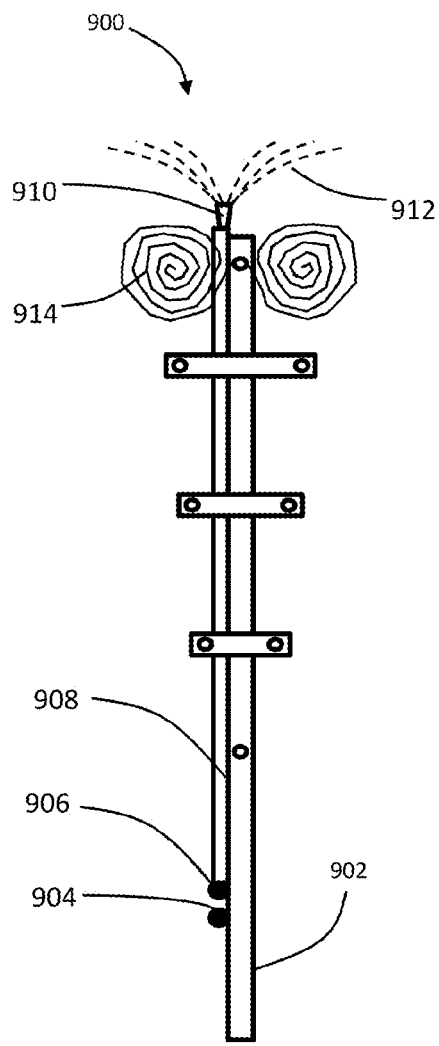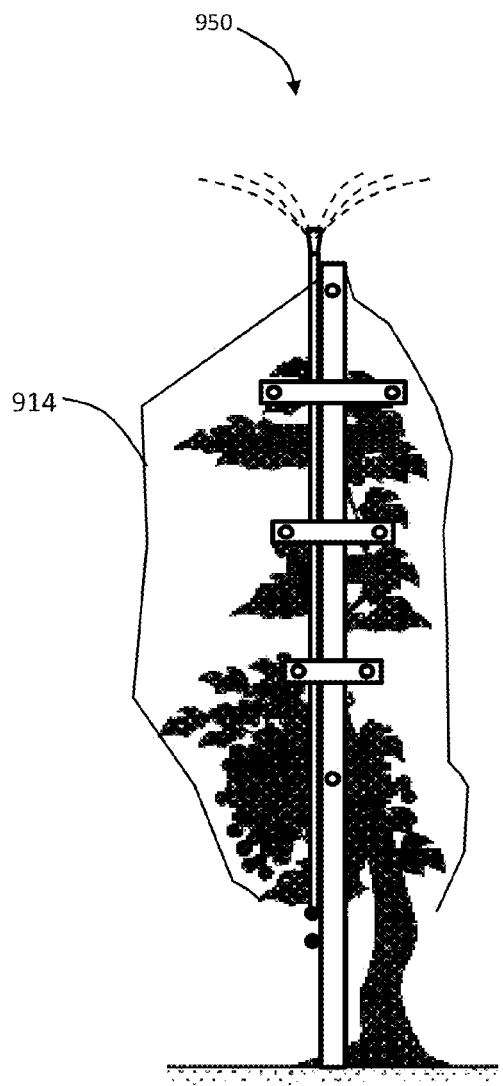
Figure 9a                    Figure 9b

TRELLIS SYSTEM FOR IRRIGATION AND FROST PREVENTION

CROSS REFERENCES TO RELATED APPLICATIONS

This patent application is related to co-pending patent application Ser. No. 13/081,984 filed on Apr. 7, 2011 and co-pending patent application Ser. No. 13/082,005 filed on Apr. 7, 2011, and this patent application claims the benefit of provisional patent application 61/322,739 filed on Apr. 9, 2010 and claims the benefit of provisional patent application 61/322,761 filed on Apr. 9, 2010 and claims the benefit of provisional patent application 61/322,773 filed on Apr. 9, 2010, which are hereby incorporated by reference in their entirety.

FIELD

The present invention relates to an irrigation and frost prevention system. More particularly, the invention is related to a trellis with drip and spray systems to allow delivery of heated water to the area surrounding the trellis.

BACKGROUND

Surface water resources are generally more suitable for irrigation than groundwater resources because of the water quality associated with surface waters. Additionally, hot springs associated with geothermal sources may include dissolved gases and heavy metals. Therefore, heated water from geothermal sources may contain undesirable contaminants which make the water unsuitable for agricultural irrigation.

Surface water resources are subject to daily, monthly, seasonal and annual changes in temperature. These changes in temperature may result in cold temperature spikes, which may in turn lead to frozen pipes and frozen valves. Additionally, during cold temperature many plants may be damaged or killed by freezing temperatures or frost.

Frost is the solid deposition of water vapor from saturated air; frost is formed when solid surfaces are cooled to below the dew point of the adjacent air. There are many types of frost. Many plants can be damaged or killed by freezing temperatures or frost; the damage depends on the type of plant and tissue exposed the low temperatures.

Vines for winemaking also can be affected by cold temperature spikes. For example, frost injury may occur to grapevine tissue and buds. Irrigation with sufficiently warm water during a freeze may provide protection to the plants.

The selective inverted sink is a device used by farmers to protect plants from frost by blowing the denser cold air from ground level towards the sky, thereby circulating the warmer air down to the ground level. However, the energy requirements for the selective inverted sink are substantial and this additional expense generally results in a larger carbon footprint.

Thus, it would be desirable to have an affordable system for preventing the damage to plants exposed to low temperatures and frost.

Furthermore, it would be desirable to provide a trellis mounted system for irrigation and frost prevention.

SUMMARY

A trellis mounted system for irrigation and frost prevention is described. The irrigation system comprises a trellis, a first conduit coupled to the trellis, and a second conduit coupled to the trellis. A heated water stream flows through the first conduit, which terminates in a nozzle that provides a heated water spray to an area surrounding the trellis. The second conduit provides drip irrigation to a ground area surrounding the trellis.

In some embodiments, the heater water stream is generated by a heat exchanger that transfers heat from water obtained from a geothermal heated water source to surface water obtained from a surface water source.

A trellis is also described. The trellis comprises a post having at least one opening to receive a first wire. At least one crossbar is coupled to the post. The crossbar has at least one opening to receive at least a second wire. A first conduit coupled to the trellis post delivers a heated water stream to a means for delivering a heated water spray to an area surrounding the trellis. A second conduit coupled to the trellis post is configured to provide drip irrigation to a ground area surrounding the trellis.

The trellis may be part of a trellis system in which a wire is supported by a plurality of trellises. In some embodiments, each trellis has an attached nozzle for distributing a heated water spray. In other embodiments, alternating trellises have nozzles, such that a nozzle on a trellis serves an area encompassing one or more neighboring trellises. The pattern of the spray issuing from the trellis may be oriented substantially along the wire between trellises. In other embodiments, the spray pattern is oriented substantially perpendicular to the wire between trellises.

A method for irrigating an area surrounding an agricultural trellis is also described. A heated water stream is conducted through a first conduit coupled to a trellis and into a nozzle coupled to the conduit. The nozzle delivers the heated water as a spray to the area surrounding the trellis. Irrigation water is conducted through a second conduit coupled to the trellis. The second conduit provides drip irrigation to a ground area surrounding the trellis.

In another embodiment, the method comprises receiving geothermal heated water from a geothermal heated water source at a first heat exchanger input and receiving surface water from a surface water source at a second heat exchanger input. The heat exchanger transfers heat from the geothermal heated water to the surface water, producing a heated surface water stream at an output of the heat exchanger.

FIGURES

The illustrative embodiment will be more fully understood by reference the following drawings which are for illustrative, not limiting, purposes.

Figure 4:
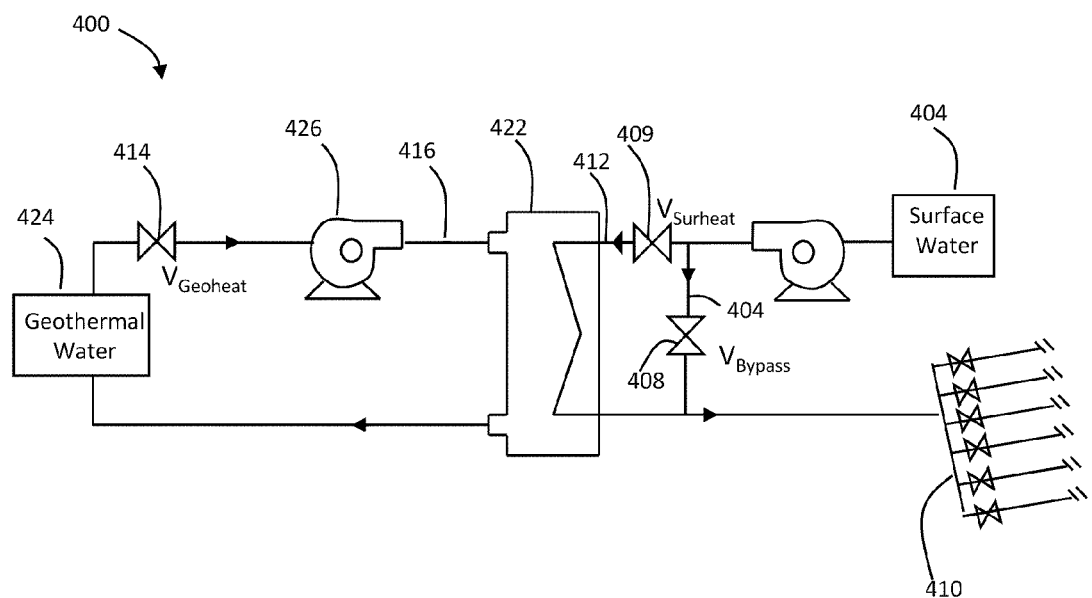
FIG. 4 shows illustrative valves for an irrigation water heating system.
Figure 5A:
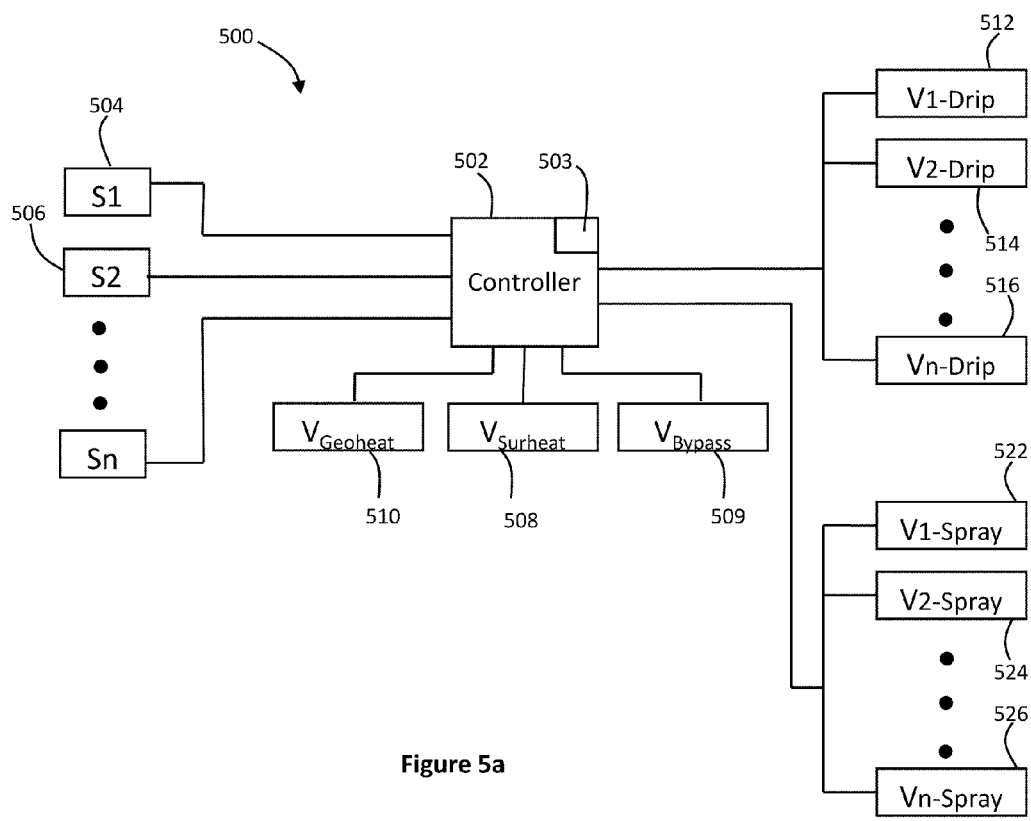

FIG. 5*a* shows an illustrative control system for the irrigation water heating system of FIG. 4.

Figure 5B:
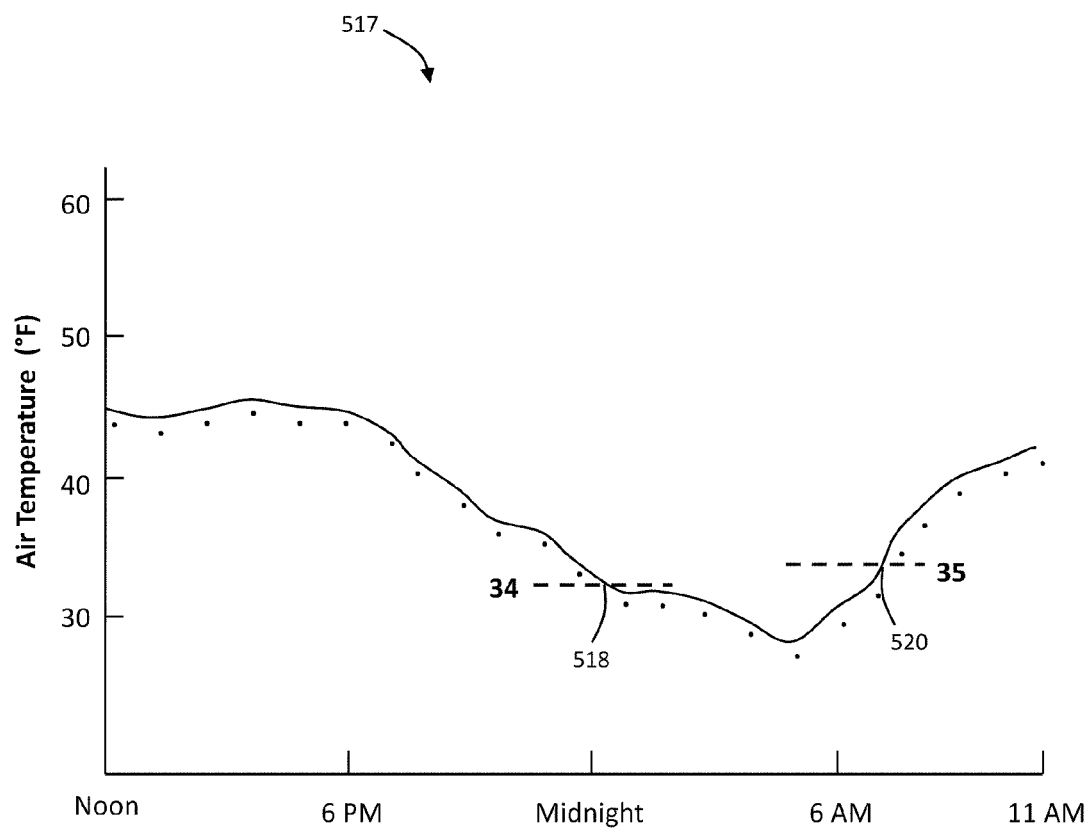

FIG. 5*b* shows an illustrative graph indicating points at which the irrigation water heating system may be engaged and disengaged relative to air temperature.

Figure 5C:
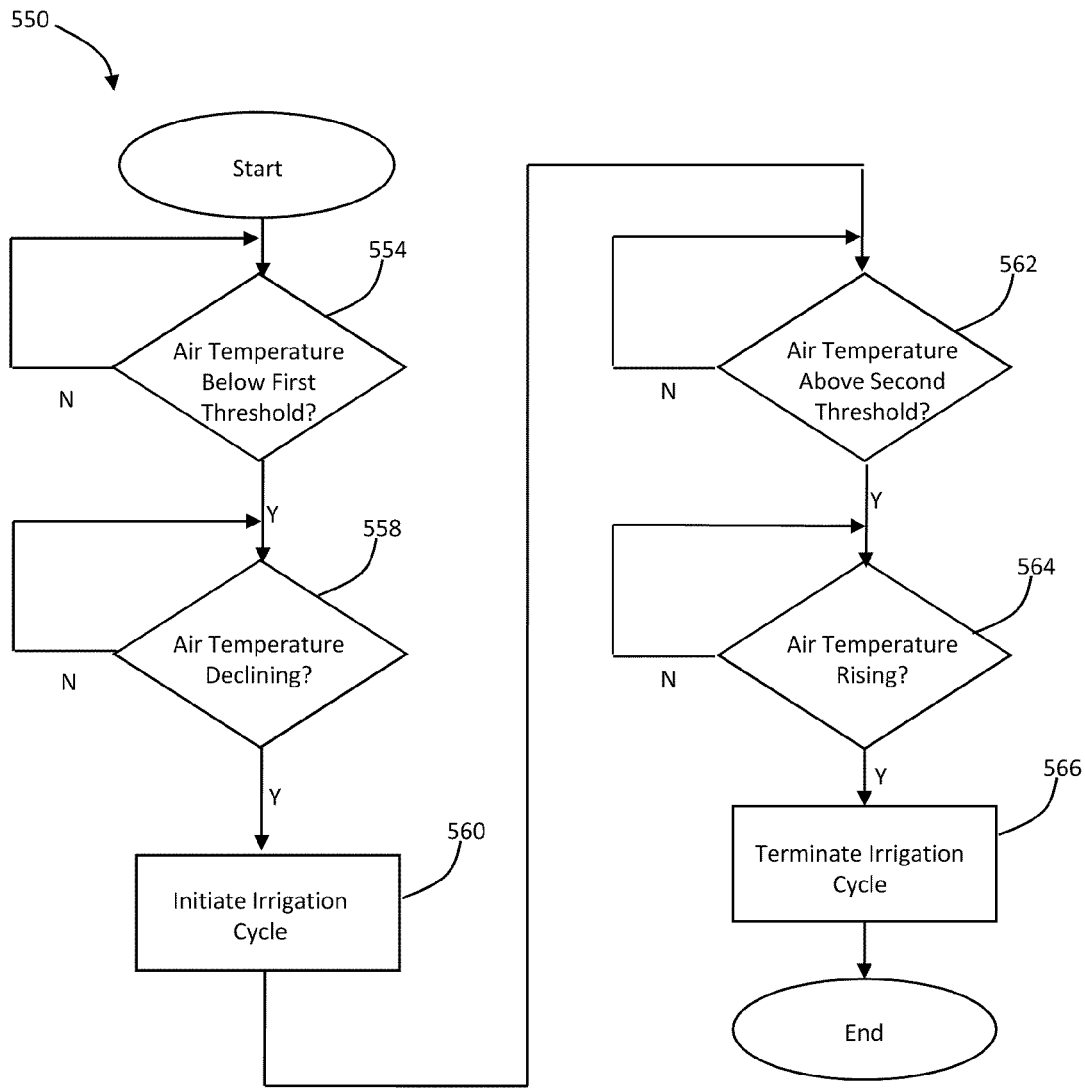

FIG. 5*c* shows an illustrative flow chart for the operation of the control system.

Figure 6:
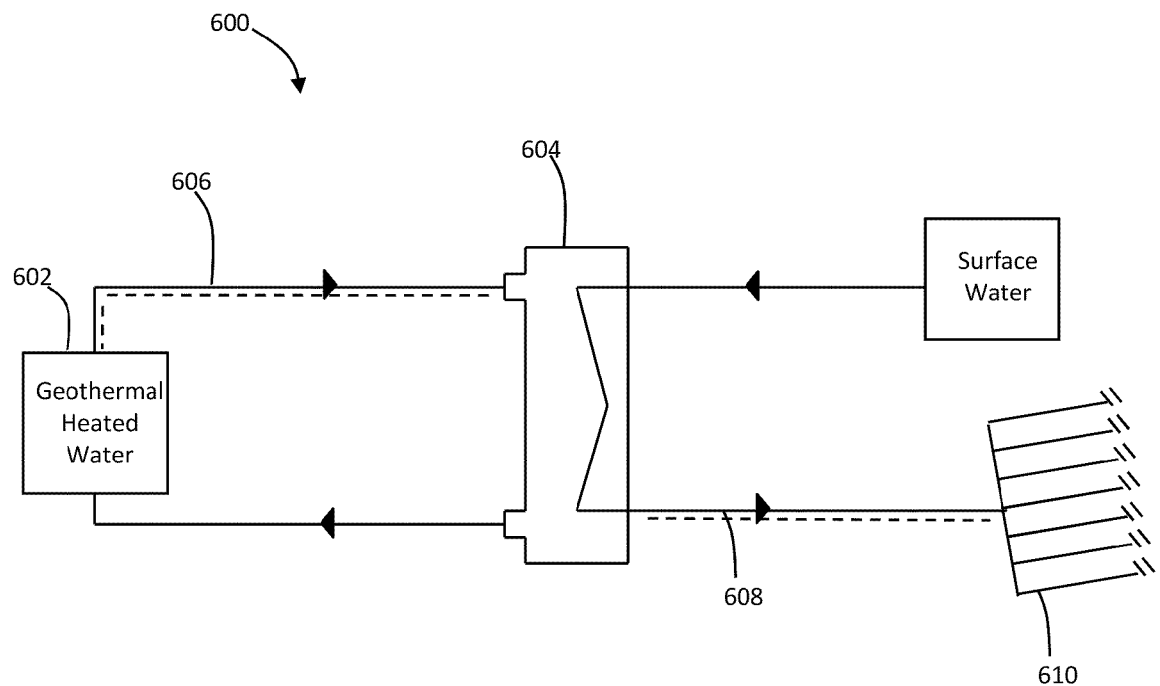

FIG. 6 shows an illustrative system for using of conduit insulation in an irrigation water heating system.

Figure 7:
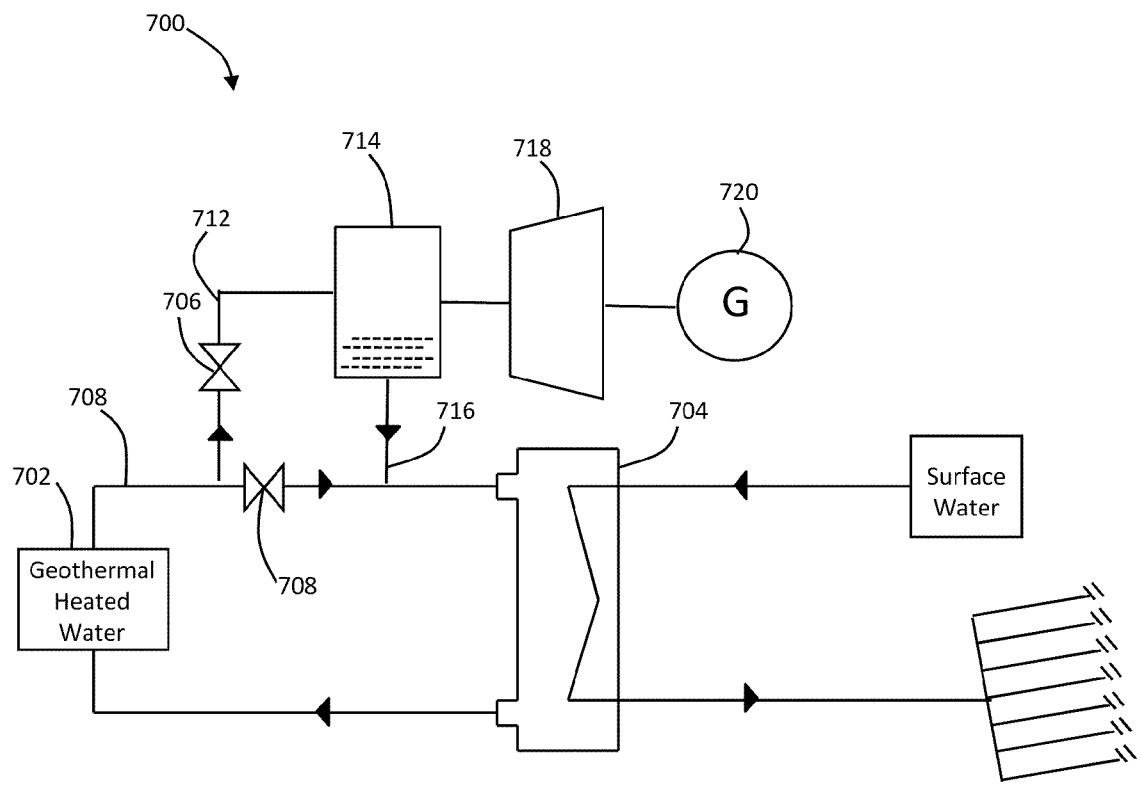

FIG. 7 shows an illustrative system for generating power using excess heat from the irrigation water heating system.

Figure 8A:
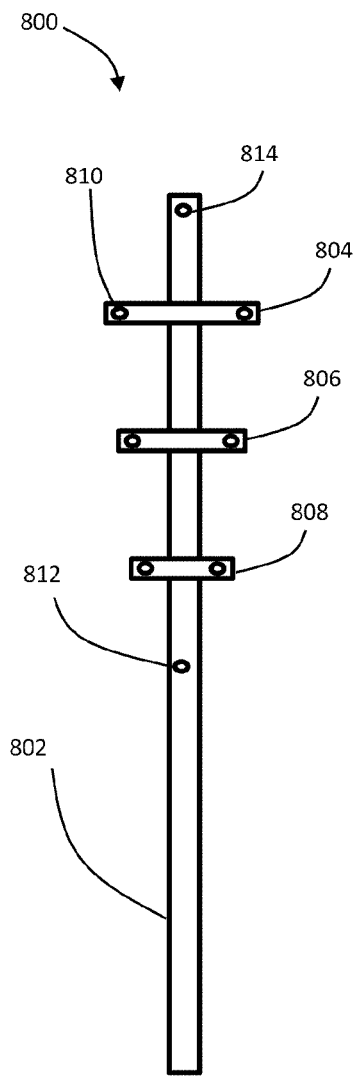

FIG. 8a shows a side elevation of an illustrative agricultural trellis.

Figure 8B:
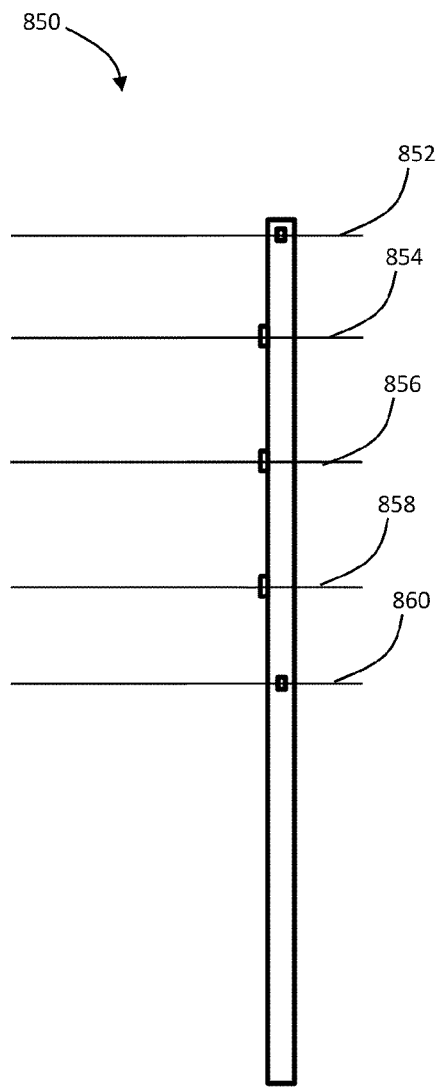

FIG. 8b shows a front elevation of an illustrative agricultural trellis.

FIG. 9a shows an illustrative trellis with integrated mounted drip and spray irrigation systems and protective net.

FIG. 9b shows an illustrative trellis with its protective net deployed.

Figure 10A:
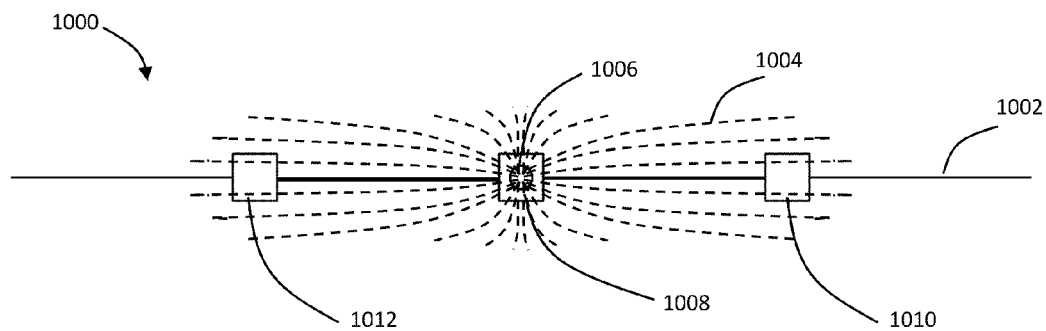

FIG. 10a shows an illustrative first spray pattern of a nozzle in a spray irrigation system.

Figure 10B:
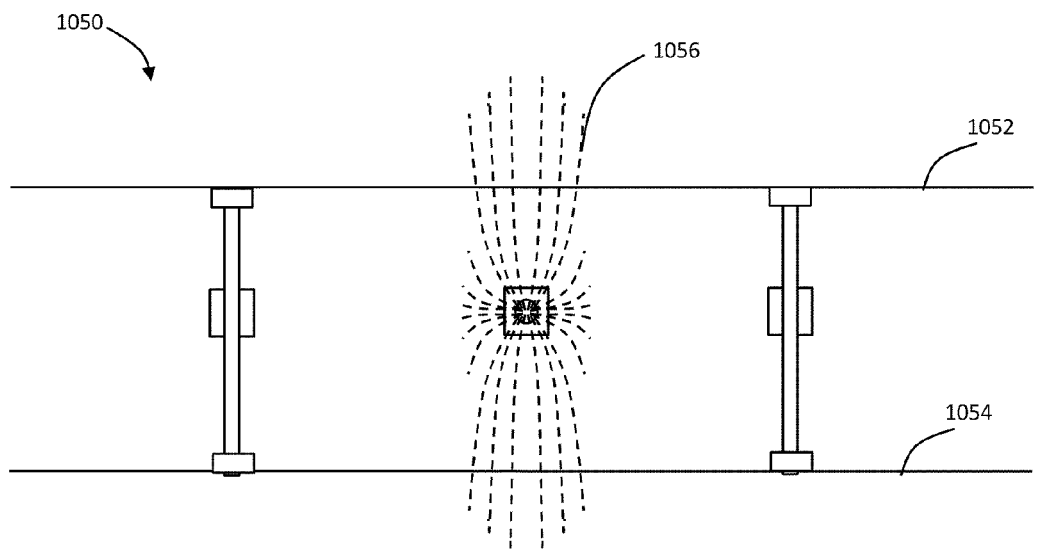

FIG. 10b shows an illustrative second spray pattern of a nozzle in a spray irrigation system.

Figure 11:
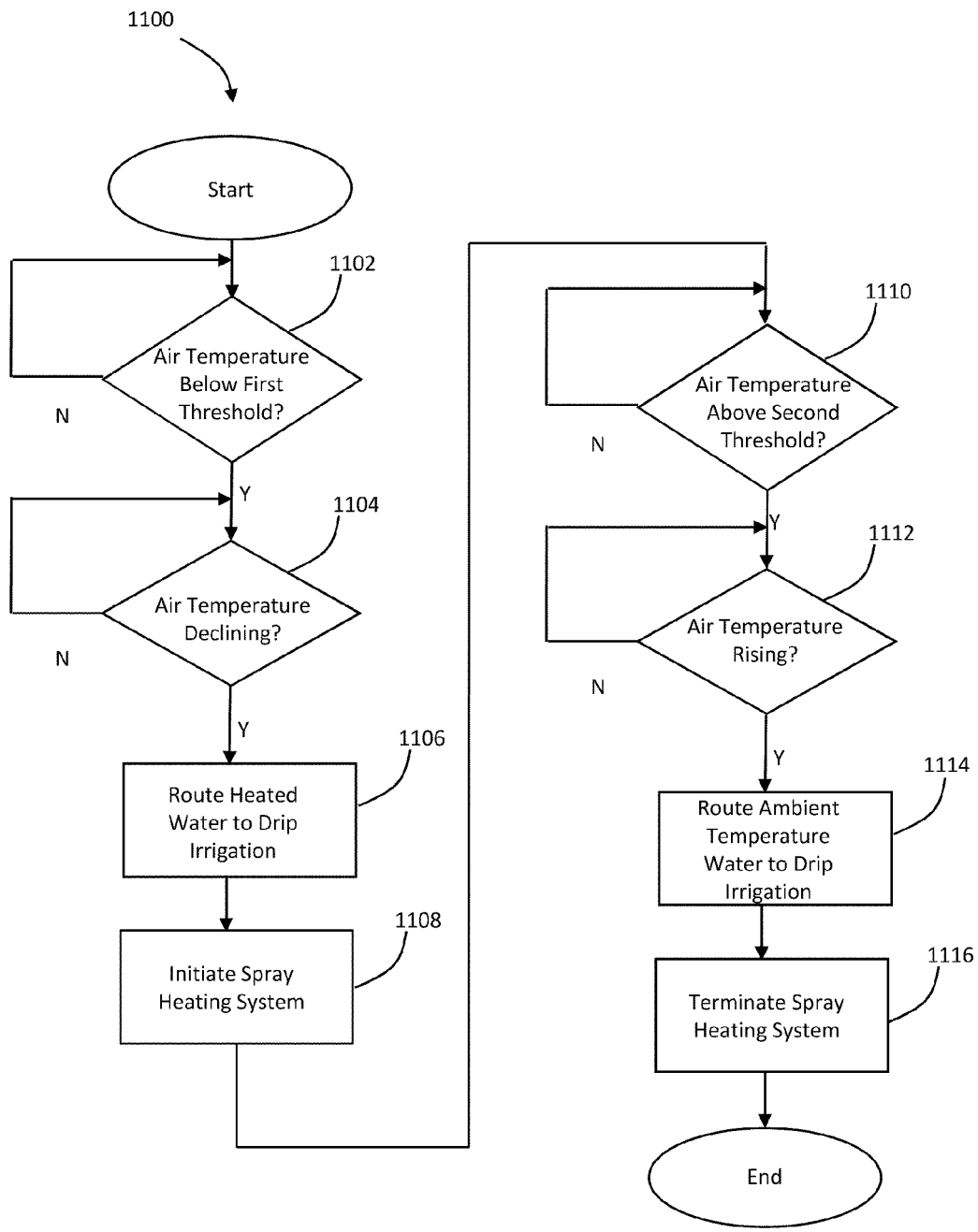

FIG. 11 shows an illustrative flow chart for the operation of the drip and spray irrigation systems.

Figure 12A:
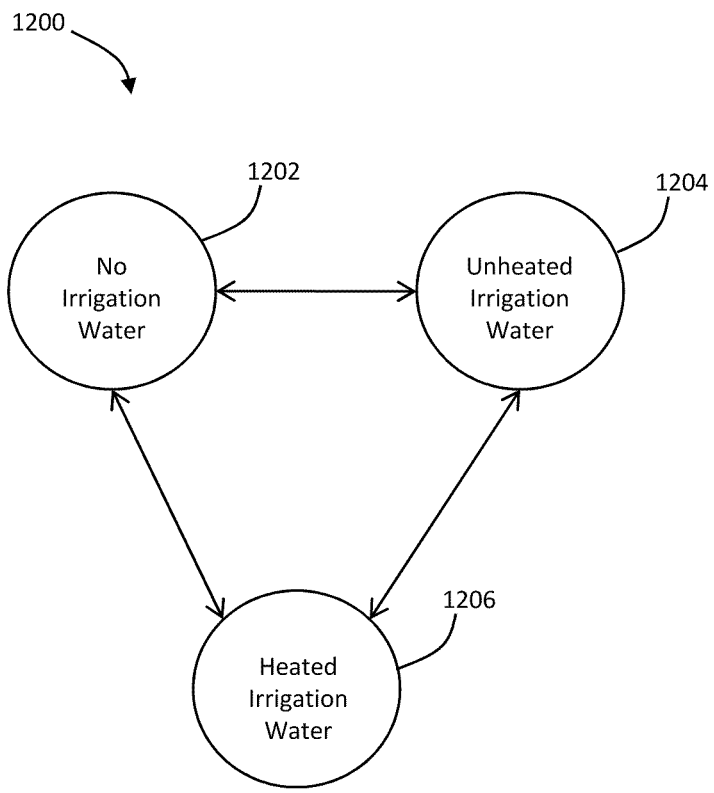

FIG. 12a shows an illustrative diagram for explaining the transitions between system states in the drip irrigation system.

Figure 12B:
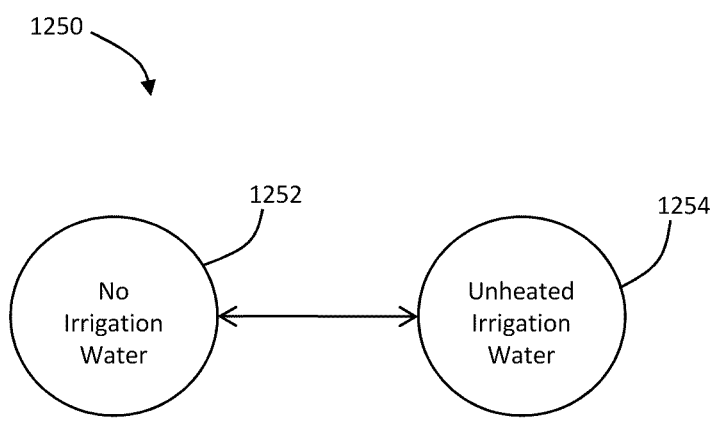

FIG. 12b shows an illustrative diagram for explaining the transitions between system states in the spray irrigation system.

DETAILED DESCRIPTION

Persons of ordinary skill in the art will realize that the following description is illustrative and not in any way limiting. Other embodiments of the claimed subject matter will readily suggest themselves to such skilled persons having the benefit of this disclosure. It shall be appreciated by those of ordinary skill in the art that the surface water heating system, control systems, and methods described hereinafter may vary as to configuration and as to details.

In the embodiments described herein, the illustrative geothermal heated fluid is water. Other illustrative geothermal heated fluids include, but are not limited water, salt water, brine solutions, steam, mud, and similar fluids (including gases) that are heated by geothermal energy.

In general, the geothermal heated fluid is used in a heat exchange system so that the geothermal heated fluid does not come into contact with the surface water. In this manner, damage to irrigation systems from frozen surface water in pipes can be avoided. Moreover, the heated irrigation water can be used to prevent frost damage to irrigated crops such as grapevines.

In the embodiment described herein the term geothermal heated fluid and heated water are used interchangeably. In certain embodiments, the geothermal heated fluid is associated with a liquid phase, a gas phase, and the combination thereof. For example, a hot spring can include a gas phase such as steam, and the liquid phase may be a brine, water or mud.

Figure 1:
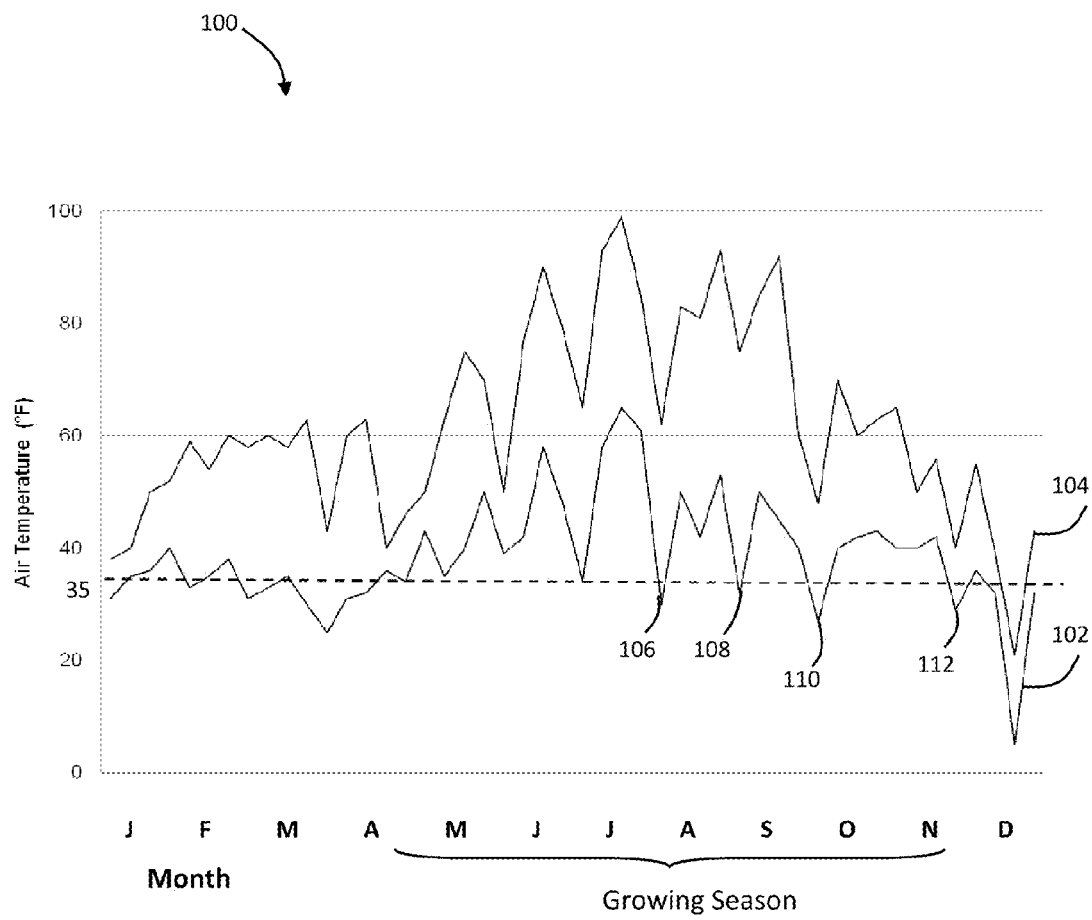
FIG. 1 shows an illustrative graph indicating the low temperature spikes that may occur during the growing season.

Referring now to FIG. 1, an illustrative graph 100 shows exemplary outside air temperatures during a growing season in a region where the irrigation water heating system may be used. For example, the growing season for a vineyard at a high elevation, such as 5000 feet, may occur between April and November as indicated in FIG. 1. Exemplary high and low temperatures are indicated by curves 102 and 104, respectively. During the growing season, the low temperature regularly drops below a temperature at which frost on agricultural plants becomes a concern, e.g. 35° F., as indicated at 106-112. The low temperature spikes may present a danger to agricultural plants, such as grapevines, because frost injury may occur to the plants. Irrigation can provide a degree of protection from frost, and the benefit of irrigation during a freeze increases as the temperature of the irrigation water rises.

Figure 2:
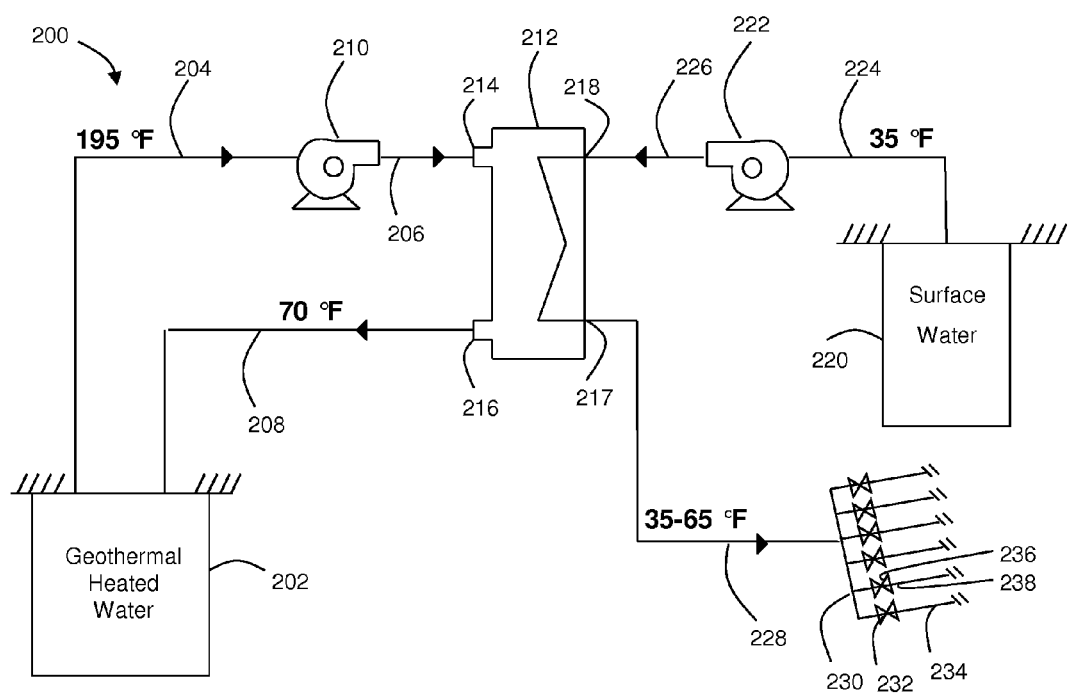
FIG. 2 shows an illustrative irrigation water heating system.

Referring to FIG. 2, an illustrative irrigation water heating system 200 is shown. Geothermal water source 202 includes, for example, a well, hot spring, and other such sources containing geothermal heated fluid. For example, geothermal water is pumped out of the geothermal water source 202 through conduit 204 by geothermal water pump 206. The temperature of the geothermal water is high relative to the temperature of the surface water, for example, 195° F. The geothermal water is then pumped by pump 210 into a heat exchanger 212.

A geothermal water conduit system comprised of conduit segments 204, 206, and 208 is a channel along which water flows. It may be, for example, pipe or tubing. The conduit may comprise different materials at different segments. For example, conduit segment 204 may be a pipe of steel while conduit segment 208 may be an open channel in the ground.

Because the conduit segments 204, 206 and 208 and heat exchanger 212 form a loop originating at and returning to geothermal water source 202, the geothermal water conduit system is also referred to as the geothermal loop. The pump, 210, displaces geothermal water along the geothermal water loop.

Heat exchanger 212 is a device that transfers heat from the geothermal heated water stream to the surface water resources, without allowing the geothermal heated water to come into contact with the surface water. In one illustrative embodiment, the heat exchanger may have, for example, a shell and tube design. In a shell and tube heat exchanger, one fluid flows through a shell while the other fluid flows through tubes located within the shell. In a shell and tube heat exchanger, the heat exchanger has a shellside inlet, where the hot water stream enters the heat exchanger shell; a shellside outlet, where the hot water stream exits the heat exchanger shell; a tubeside inlet, where the cold water stream enters the heat exchanger tubes, and a tubeside outlet, where water exits the heat exchanger tubes. An illustrative shell and tube heat exchanger is explained further in the description of FIG. 3, below.

Alternatively, the heat exchanger 212 may have, for example, a plate-frame or plate-coil design. Also, in certain embodiments a series of heat exchangers is used to provide the desired amount of heating for the surface water.

In the illustrative embodiment shown in FIG. 2, the geothermal heated water enters the heat exchanger 206 through the shellside inlet 214 and exits the heat exchanger through the shellside outlet 216. The geothermal heated water is returned along conduit 208 to the geothermal water source 202. The geothermal heated water in the return path has been cooled in the heat exchanger, for example, 70° F.

Surface water is pumped by surface water pump 222 from surface water source 220 into the heat exchanger 212 via conduit segments 224 and 226. The surface water enters the heat exchanger 212 through the tubeside inlet 218 and exits the heat exchanger through the tubeside outlet 217. The irrigation water heating system may be engaged, for example, when the surface water has a temperature of 35° F. The heated surface water is delivered to the irrigation manifold 230 via the conduit segment 228. The heated surface water has been heated within the heat exchanger to a temperature beneficial to preventing frost formation on agricultural plants, for example, 50° F. At the irrigation manifold 230, the surface water stream is divided into multiple streams to provide irrigation coverage at intervals along the crop area.

The irrigation manifold 230 comprises multiple irrigation channels or rows, each of which may be controlled by a valve such as valve 232. The valve regulates the flow of water through the channel. The valve typically has two states, an open state and a closed state. When the valve is in the open state, water can flow through the valve. When the valve is in the closed state, water is prevented from flowing through the valve.

Each irrigation channel provides irrigation water to a different segment of an agricultural field. The valves are opened and closed such that irrigation water flows to each row serially. Thus, a first valve 232 is opened, and water flows through a first irrigation channel 234. When the desired amount of water has been delivered to the segment served by irrigation channel 234, the first valve 232 is closed, and a second valve 236 is opened to provide irrigation water through a second irrigation channel 238.

In some embodiments, the irrigation manifold comprises a second set of irrigation channels (not shown) for a spray irrigation system, which provides heated irrigation water as mist or spray. The irrigation channels of the spray irrigation system have valves to control delivery of irrigation water to the irrigation channels. The irrigation channels of the spray irrigation system terminate in an outlet such as a sprinkler nozzle (not shown) or mister nozzle (not shown) that disperses the heated irrigation water as mist or spray. The sprinklers or misters may be at ground level or elevated above ground level by a stand, trellis, or other such device that elevates the mister or sprinkler.

When irrigation with heated water is used to prevent the formation of frost on plants, the plants may receive more water than would typically be applied for irrigation. The excess water may be harmful to the plants. The irrigated area may feature a drainage system (not shown) to avoid harm to the plants from excess irrigation.

Figure 3:
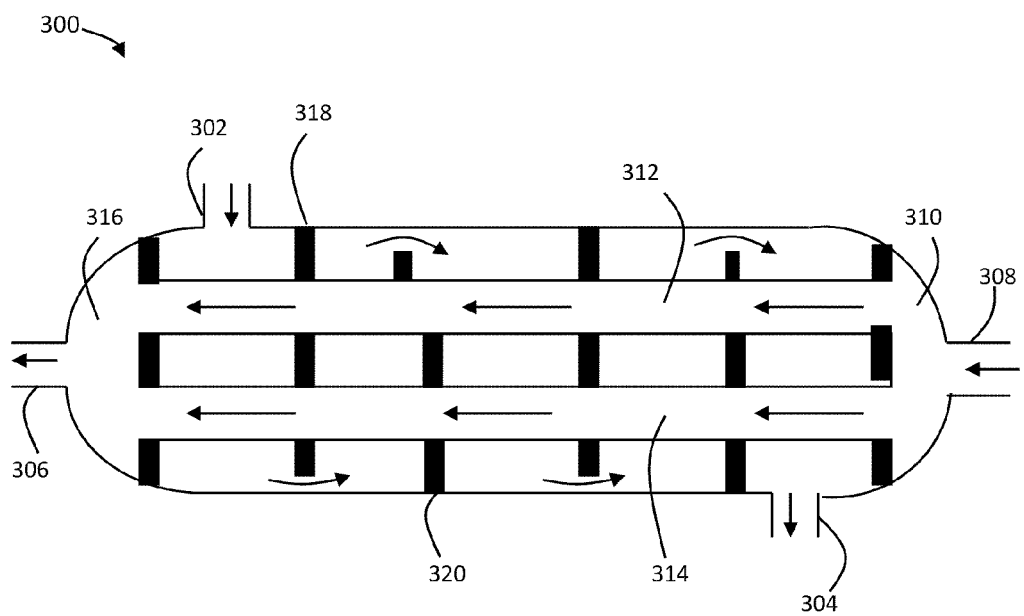
FIG. 3 shows an illustrative heat exchanger for an irrigation water heating system.

Referring to FIG. 3, an illustrative shell and tube heat exchanger 300 is shown. A first fluid flows enters the shell at shellside inlet 302 and exits the shell at shellside outlet 304. A second fluid enters tube inlet plenum 310 at tubeside inlet 308. Tubes 312 and tube 314 branch off of tube plenum 310. The second fluid flows through tubes 312 and 314 in the direction indicated by the arrows. The second fluid flows from the tubes into tube outlet plenum 316 and exits the heat exchanger at tubeside outlet 306. The first and second fluids are shown in a counterflow arrangement with the first fluid flowing in the opposite direction of the second fluid, however, other the heat exchanger may be designed with alternative flow configurations, such as a parallel flow configuration.

In the illustrative embodiment, the first geothermal heated fluid may be geothermal water or geothermal gas. The second fluid is a surface water. The illustrative surface water may be drawn from a lake, stream, irrigation ditch, or other such surface water source. As the illustrative geothermal heated water and the surface water flow through the heat exchanger, heat from the geothermal water is transferred to the surface water. The heat exchanger is shown with two tubes for illustrative purposes, however, the number of tubes in the heat exchanger will vary depending on the amount of heat transfer required and respective rates of flow of the first and second fluids.

The heat exchanger may include baffles such as baffle 318 which create a tortuous path for fluid flowing through the shell. The first fluid flows under baffle 318 and then over baffle 320, as indicated by the curved arrows. The tortuous route increases the amount of contact between the first fluid and the second fluid which increases the amount of heat exchanged between the fluids. It will be appreciated that various baffle configurations, as well as other methods for creating a tortuous route through the heat exchanger, may be used.

Referring to FIGS. 4 and 5 there are shown illustrative valves associated with the irrigation system 400, in which the valves are controlled by illustrative control system 500. There are three valves 414, 409 and 408 displayed in FIGS. 4 and 5. The first valve 414 controls the flow of geothermal water from the illustrative heated geothermal water source 424 to the heat exchanger 422. The second valve 409 controls the flow of the surface water to the heat exchanger 422, in which the heated surface water is transferred along conduit 419 and delivered to the irrigation manifold 410. The third valve 408 is a bypass valve that is opened when surface water heating is not utilized, so the surface water flows directly from the surface water source 402 along conduit 404 to irrigation manifold 410. One or more sensors, as shown in FIG. 5 and described in further detail below, trigger the opening and closing of the valves and pumps associated with the irrigation apparatus, systems and methods described herein.

In one embodiment, an illustrative air temperature sensor 504 is an input to the control unit 500. The air temperature data generated by the air temperature sensor 504 may be collected in a buffer in the control unit memory.

For example, if the air temperature drops below a first threshold temperature, e.g. 34° F., the controller generates an instruction to open valve 414, open valve 409 and close valve 408 and engage the water heating system. Referring to FIG. 5b the air temperature of 34° F. occurs at intersection 518, and at approximately midnight the surface water heating system is triggered.

In some embodiments, when the air temperature drops below the first threshold temperature, the control unit determines from the air temperature data in the buffer whether the temperature has been falling over a predetermined period of time. If the air temperature has dropped below a first threshold temperature and the temperature has been falling, the controller generates an instruction to engage the water heating system.

In another embodiment, the controller will also determine a rate of change in temperature, which is compared against a threshold rate stored in memory. The rate of change in temperature may be an additional factor used by the controller in the determination of whether the controller will generate an instruction to engage the water heating system.

When the irrigation water heating system is engaged, the following illustrative events take place: the control unit 500 will close valve 408 to shut off the flow of surface water along conduit 404; valve 409 is opened and the water flowing along conduit 404 is rerouted to the heat exchanger 422 via conduit 412; and the control unit will open valve 414 to allow geothermal water to flow from geothermal water source 424 into the heat exchanger 422 via conduit 416. Additionally, geothermal pump 426 may be engaged.

If the air temperature as measured by the air temperature sensor rises above a second threshold temperature, for example 35° F., the control system 500 generates an instruction to disengage the water heating system.

In some embodiments, when the air temperature rises above the second threshold temperature, e.g. 35° F., the controller determines from air temperature data stored in the buffer whether the air temperature has been rising over a predetermined period of time. If the air temperature is above the second threshold temperature and the controller determines that the temperature has been rising, the controller will generate an instruction to disengage the irrigation water heating system.

When the water heating system is disengaged, geothermal water valve 414 is closed to stop the flow of geothermal water. Additionally, geothermal pump 426 may be disengaged.

Heated surface water valve 409 is closed and surface water bypass valve 408 is opened to enable the surface water to flow directly into the irrigation manifold without passing through the heat exchanger.

Referring to now to FIG. 5a, the illustrative control system 500 comprises controller 502. An illustrative controller includes a processor, irrigation controller, PID controller and other such devices that monitor and affect the operation conditions of a given dynamic system. A memory 503 is shown. The memory includes, by way of example and not limitation, RAM, ROM, EPROM, EEPROM, flash memory, L1 Cache, L2 Cache and other such memory associated with controller 502. The controller receives input from sensor S1 shown at 504. S1 may be, for example, an air temperature sensor. The controller may receive input from additional sensors S2, shown at 506, through Sn.

Controller 502 generates instructions to control the flow of water through the water heating system. The controller may generate an instruction to control the flow of the heated geothermal water 508, typically by generating an instruction to open a valve between the geothermal water source 424 and heat exchanger 422. The controller may generate an instruction to close valve 406 to divert surface water 510 through the heat exchanger so that heated irrigation water is provided to irrigation manifold 410.

The controller also controls the flow of water within the irrigation manifold 410, which comprises irrigation conduits to provide water to drip irrigation systems to each row in an agricultural field, with the flow of water to the irrigation conduits controlled by valves $V_1$-Drip through $V_n$-Drip, as shown at 512-516. The irrigation water may be provided to one irrigation conduit at a time. To provide irrigation water the irrigation conduits serially, the controller 502 may generate an instruction to open valve $V_1$-Drip. When the desired amount of water has been provided via $V_1$-Drip, the controller generates an instruction to close the valve $V_1$-Drip. Subsequently, the controller generates an instruction to open a valve $V_2$-Drip. When the desired amount of water has been provided via $V_2$-Drip, the controller generates an instruction to close the valve $V_2$-Drip. The controller continues to generate instructions to open and close valves to the irrigation conduits until the row served by $V_n$-Drip has received the desired amount of water. In one embodiment, the controller uses a value stored in memory to determine the amount of water required for each irrigation conduit. The controller 502 may generate instructions to control valves 508-510 and 512-516 such that the drip irrigation system provides heated irrigation water, unheated irrigation water, or no irrigation water.

Irrigation manifold 410 may also provide water to spray irrigation outlets via valves $V_1$-Spray through $V_n$-Spray, as shown at 522-526, which control the flow of water to irrigation conduits serving the rows of an agricultural field. The irrigation conduits of the spray system terminate in nozzles which deliver irrigation as a mist or a spray The spray system valves may be activated serially, as described above with respect to the drip system valves. The controller 502 may generate instructions to control valves 508-510 and 522-526 such that the spray irrigation system provides heated irrigation water or no irrigation water. The spray irrigation system may provide heated irrigation water independently of, or alternatively, at the same time as the drip irrigation system provides irrigation water to a row in an agricultural field. In one embodiment (not shown), the spray system and the drip system are activated by the same set of valves.

In operation, the first and second threshold temperatures that affect the control system 500 shall vary based on the agricultural plants requiring protection from frost, soil type, soil moisture, air temperature and other weather conditions.

The frost point temperature is a temperature at which water vapor condenses from the air and deposited as frost. Frost may be damaging to plants as discussed above. Frost point is related to the humidity of the air, which is a measure of the amount of water vapor in the air. A sensor for detecting the humidity of the air may be used as an input to the control system. The sensor may be, for example, a capacitive relative humidity sensor.

In some embodiments, the controller may use an alternative sensor in place of the air temperature sensor to determine when the irrigation water heating system is to be engaged and disengaged. For example, the controller may make a determination based on the temperature as measured by a soil temperature sensor. Alternatively, the controller may use more than one sensor input in its determination of when to engage the irrigation water heating system. The controller may use input from at least one of an air temperature sensor, a humidity sensor, a barometric pressure sensor, a soil temperature sensor, a soil moisture sensor and a wind velocity sensor to make the determination. It will be recognized that additional sensor types may be used as an input that the controller will use in a determination of when to engage and disengage the irrigation water heating system.

The temperature sensor measures the temperature of its surroundings and outputs a signal corresponding to the measured temperature. The measurement may be taken with, for example, a thermistor. The control system uses at least one temperature signal to determine when to engage and disengage the irrigation water heating system.

Moist soil is comparatively more able to retain heat and provide protection to plants against cold weather than a drier soil. Accordingly, a sensor for detecting the moisture of the soil may be used as an input to the control system. The soil moisture sensor determines the amount of moisture in the soil, for example, by measuring the volumetric water content of the soil, and outputs a signal corresponding to the measured moisture level. The soil moisture sensor may use, for example, a frequency domain reflectography approach in which radio frequency waves are used to determine the dielectric properties of the soil.

In some embodiments, the control system comprises a user interface. The user interface allows the user to make changes to the functionality of the control system. For example, the user interface may allow the user of the irrigation water heating system to alter a threshold temperature stored in memory. In another example, the user interface allows the user to change the instructions generated by the controller in response to the input information it receives. The user interface may also allow the user to add and subtract inputs to the control system.

The user interface may be located on a remote terminal, which communicates with the controller over a network. Alternatively, the user interface may comprise a keypad operatively coupled to the controller and a display operatively coupled to the controller.

Referring to FIG. 5b, an illustrative graph indicating points at which the irrigation water heating system may be engaged and disengaged relative to air temperature is shown. FIG. 5b shows an exemplary illustration of the changes in air temperature over the course of a day in an area where agricultural frost damage of concern. The irrigation water heating system may be engaged when the air temperature drops below 34° F. at approximately midnight, as shown at intersection 518. Controller 502 may also examine air temperature data stored in a buffer in memory to determine whether the air temperature has been falling. If the air temperature has been falling over a predetermined period of time and the air temperature is below 34° F., the controller generates an instruction to engage the irrigation water heating system.

The irrigation water heating system may be disengaged when the air temperature rises above 35° F. at about approximately 7:30 AM, as shown at intersection 520. The air temperature data stored in a buffer in memory may also be used by the controller to determine whether the temperature has been rising. If the air temperature has been rising over a predetermined period of time and the air temperature is above 35° F., the controller generates an instruction to disengage the irrigation water heating system.

Referring to FIG. 5c, a method 550 for engaging and disengaging the water heating system is shown. The method begins at decision diamond 554, in which the control system compares the air temperature as measured by an air temperature sensor against a first threshold temperature. If the air temperature is lower than the first threshold temperature, the method proceeds to decision diamond 556, in which the control system determines whether the air temperature has been declining over a predetermined period of time. For example, the control system may determine that the air temperature has been declining if the temperature stored at time t in the buffer is lower than the temperature stored at time t−1, and the temperature stored at time t−1 is lower than the temperature stored at a time t−2, and so on through time t−n where n is the number of temperature readings stored in the buffer. Alternatively, n may be a subset of the temperature readings stored in the buffer corresponding to a predetermined time period.

If the air temperature has been declining, the method proceeds to block 560. In block 560, the valve 414 in the conduit 416 connecting the geothermal water source to the heat exchanger 422 is opened. The method proceeds to decision diamond 562, in which the control system compares the air temperature against a second threshold temperature. If the air temperature is greater than the second threshold temperature, the method proceeds to decision diamond 564 where the control system determines whether the air temperature has been rising over a predetermined period of time. For example, the control system may determine that the air temperature has been rising if the temperature stored at time t in the buffer is higher than the temperature stored at time t−1, and the temperature stored at time t−1 is higher than the temperature stored at a time t−2, and so on through time t−n. If the air temperature has been rising, the method proceeds to block 566. In block 566, valve 414 is closed to stop the flow of geothermal water through the heat exchanger.

Referring to FIG. 6, an illustrative system 600 for using conduit insulation in an irrigation water heating system is shown. It may be beneficial to insulate the water traveling between the geothermal water source 602 and the heat exchanger 604 to minimize loss of heat from the geothermal water along the conduit 606. Conduit 608 may be insulated to minimize the loss of heat from surface water heated in the heat exchanger 604 as the surface water is delivered to irrigation manifold 610. The locations for conduit insulation in the irrigation water heating system are indicated by dotted lines along conduits 606 and 608. The insulated conduits may be prefabricated pipes containing insulating material such as fiberglass, or may be fabricated from a pipe surrounded by an insulating material such as a polymer foam. Insulated conduits may also be pipes which are buried and insulated by the ground.

Referring to FIG. 7, an illustrative system 700 for generating power using excess heat from a geothermal heated fluid is shown. The geothermal heated fluid 702 may produce more heat than is necessary for heating surface water in heat exchanger 704. Excess heat may be produced periodically or it may always be available. Geothermal heat may be used to generate power whenever the irrigation water heating system is disengaged.

In one embodiment, valves 706 and 708 are used to control the flow of geothermal heated fluid from the geothermal water source 702. When power generation is initiated, valve 706 is open and valve 708 is closed. Geothermal heated fluid flowing through conduit 710 flows into conduit 712 and is channeled into separator 714, where the fluid is separated into steam and water. The water flows through conduit 716 to be delivered to the shellside inlet of heat exchanger 704. The steam flows to turbine 718, which drives generator 720. When power generation is disengaged, valve 706 is closed and valve 708 is open. The geothermal heated fluid bypasses the power generation system and flows directly to heat exchanger 704.

Referring to FIGS. 8a and 8b, side and front elevations of an illustrative agricultural trellis are shown, respectively. The trellis may be used to train and support an agricultural plant, such as a grapevine. The trellis comprises a post 802 and may comprise one or more cross-arms 804-808. The post and cross arms are generally comprised of wood. The cross arms may be coupled to the post with attachment means such as nails or screws. The cross arms may have openings as shown at 810. The post may also have openings as shown at 812. The openings in the post and in the cross arms may be, for example, a hole drilled through the cross arm or the pole. The openings may receive wires as shown at 852-860 in FIG. 8b. The cross arms 804, 806 and 808 receive catch wires 854, 856 and 858, respectively. Each of the cross arms shown in FIG. 8a is shown with two openings receive two catch wires. The opening 812 receives fruiting wire 860. An additional opening 812 in the trellis post may receive a net wire. The fruiting wire 860 is used to train the growth of the plant. For example, the fruiting cane of a grapevine may be trained onto the fruiting wire. One or more catch wires 854-858 may be used for additional support of the foliage and fruit of the grapevine. A net wire 852 supports a protective net as shown in FIGS. 9a-9b.

Referring to FIGS. 9a-9b, an illustrative trellis with integrated drip and spray irrigation systems and protective net is shown. FIG. 9a shows the trellis with the protective net retracted. In FIG. 9b, the protective net is deployed. Trellis 900 comprises post 902. A drip irrigation line 904 is coupled to post 902 near the base of the post. The drip irrigation line provides irrigation water to the ground surrounding the trellis. In some embodiments, a spray irrigation line 906 is coupled to post 902. The drip irrigation line and the spray irrigation line are coupled to an irrigation channel of the irrigation manifold 230. Irrigation water is channeled to the top of trellis 900 by tubing 908 coupled to the spray irrigation line 906. A nozzle 910 is coupled to the terminus of the tubing. The nozzle delivers a spray 912 of heated irrigation water to the area surrounding the trellis. In this manner, plants may be protected from damage due to cold weather damage. A protective net 914 is supported by net wire 852. The protective net provides protection to the plant from the effects of cold weather. The protective net may comprise, for example, a fabric or plastic mesh. The protective net is unfurled to partially or fully cover the plant as shown at 914 in FIG. 9b. When not in use, the protective net may be rolled or otherwise formed into a more compact shape as shown at 914 in FIG. 9a. The protective net may be secured in a rolled form by a fastener, for example, a strap with a hook and loop fastener.

Referring to FIGS. 10a-10b, illustrative first and second spray patterns of a nozzle in a spray irrigation system are shown. A first spray pattern, shown in FIG. 10a, is oriented substantially along fruiting wire 1002. Heated irrigation water issues as a spray 1004 from nozzle 1006. The nozzle 1006 is affixed to trellis post 1008. Additional trellis posts are shown at 1010 and 1012. In the trellis system shown, a spray irrigation system is affixed to alternate trellis posts such that only one of every two trellis posts has a spray nozzle. In some embodiments, a nozzle is affixed to each trellis in a trellis system. It will be recognized that other distributions of spray irrigation systems among trellises in a trellis system are possible.

A plant trained along the fruiting wire will receive substantial coverage from a spray oriented as shown in FIG. 10a. In trellises having two fruiting wires 1052 and 1054, as shown in FIG. 10b, a spray pattern 1056 oriented to provide coverage to both fruiting wires may be desirable. The spray pattern shown in 10b may also be desirable to provide coverage to trellises having foliage and fruit supported by catch wires (e.g. 854) mounted via openings at the ends of a cross arm (e.g. 804).

Referring to FIG. 11, illustrative flow chart 1100 for the operation of the drip and spray irrigation systems is shown. The method begins at decision diamond 1102, in which the control system compares the air temperature as measured by an air temperature sensor against a first threshold temperature. If the air temperature is lower than the first threshold temperature, the method proceeds to decision diamond 1104, in which the control system determines whether the air temperature has been declining over a predetermined period of time. If the air temperature has been declining, the method proceeds to block 1106. At block 1106, heated water is routed to the drip irrigation system. The method proceeds to block 1108, at which the spray heating system is initiated. At decision diamond 1110, the control system compares the air temperature against a second threshold temperature. If the air temperature is greater than the second threshold temperature, the method proceeds to decision diamond 1112 where the control system determines whether the air temperature has been rising over a predetermined period of time. If the air temperature has been rising, the method proceeds to block 1114. In block 1114, the flow of heated water the drip irrigation system is halted, and unheated (ambient temperature) irrigation water is routed to the drip irrigation system. The method then proceeds to block 116, at which the flow of irrigation water to the spray irrigation system is terminated.

In some embodiments, additional sensor inputs or logic will be used to determine whether steps 1106 or 1108 or both will occur when the conditions presented in decision diamonds 1102 and 1104 occur. Similarly, additional sensor inputs or logic may be used to determine whether steps 1114 or 1116 or both will occur when the conditions presented in decision diamonds 1110 and 1112 occur. For example, during some weather conditions, drip irrigation with heated water will be desirable but spray irrigation with heated water is unnecessary.

Referring to FIG. 12a, illustrative state diagram 1200 for the operation of the drip irrigation system is shown. The controller of the control system may be configured to enable the drip irrigation system to provide no irrigation water, unheated irrigation water, and heated irrigation water. At state 1202, no irrigation water is provided by the drip irrigation system. At state 1204, unheated irrigation water is provided by the drip irrigation system. At state 1206, heated irrigation water is provided by the drip irrigation system. The controller may enable transitions between any of states 1202, 1204, and 1206 as shown in state diagram 1200.

In an illustrative embodiment, the drip irrigation system may have an initial state 1202 of no irrigation water being provided. If irrigation is required, the controller may transition the drip irrigation system from state 1202 to 1204, to provide unheated irrigation water to the drip irrigation system. If the air temperature falls below a first threshold and the air temperature is declining, the controller may transition the drip irrigation system from state 1204 to state 1206, to provide heated irrigation water to the drip irrigation system. The controller is configured to open a valve 414 disposed between the geothermal heated water source and the heat exchanger to enable a transition between these states. If the air temperature subsequently rises above a second threshold condition and the air temperature is rising, the controller may transition the drip irrigation system from state 1206 to state 1204, closing valve 414. In some cases, the air temperature may be below a first threshold temperature and declining when the irrigation system is first initiated. In this case, the controller may transition the drip irrigation system from state 1202 to state 1206.

Referring to FIG. 12b, illustrative state diagram 1250 for the operation of the spray irrigation system is shown. The controller of the control system may be configured to enable the spray irrigation system to provide no irrigation water and heated irrigation water. At state 1252, no irrigation water is provided by the spray irrigation system. At state 1254, heated irrigation water is provided by the drip irrigation system. The controller may enable transitions between states 1252 and 1254, as shown in state diagram 1250.

In an illustrative embodiment, the spray irrigation system may have an initial state 1252 of no irrigation water being provided. If the air temperature falls below a first threshold and the air temperature is declining, the controller may transition the drip irrigation system from state 1252 to state 1254, to provide heated irrigation water to the drip irrigation system. The controller is configured to open a valve 414 disposed between the geothermal heated water source and the heat exchanger to enable a transition between these states. If the air temperature subsequently rises above a second threshold condition and the air temperature is rising, the controller may transition the drip irrigation system from state 1254 to state 1252, closing valve 414.

Typically, when heated irrigation water is provided to the drip irrigation system, heated irrigation water will also be provided to the spray irrigation system. However, in some embodiments, the control system is configured such that the spray irrigation system may provide heated irrigation water while the drip irrigation system provides unheated irrigation water.

A system for providing drip and spray irrigation with heated water has been described. Drip and spray irrigation systems may be mounted to agricultural trellises to provide heated irrigation water at ground level and as a spray at an elevated level relative to the plant supported by the trellis.

It is to be understood that the detailed description of illustrative embodiments are provided for illustrative purposes. The scope of the claims is not limited to these specific embodiments or examples. Therefore, various process limitations, elements, details, and uses can differ from those just described, or be expanded on or implemented using technologies not yet commercially viable, and yet still be within the inventive concepts of the present disclosure. The scope of the invention is determined by the following claims and their legal equivalents.

What is claimed is:

1. An irrigation system, comprising: a trellis; a first conduit coupled to the trellis; a nozzle coupled to the terminus of the first conduit; a heated water stream flows through the conduit into the nozzle, the nozzle configured to deliver a heated water spray to an area surrounding the trellis; a second conduit coupled to the trellis, the second conduit configured to provide drip irrigation to a ground area surrounding the trellis; a geothermal heated water source; a surface water source; a heat exchanger; a first heat exchanger conduit system; a second heat exchanger conduit system; a first pump configured to extract geothermal heated water from a geothermal heated water source, conduct the geothermal heated water through the heat exchanger, and return the geothermal heated water to the geothermal water source, via the first heat exchanger conduit system; a second pump configured to extract water from a surface water source, conduct the surface water through the heat exchanger via the second heat exchanger conduit system, and conduct the surface water into the second conduit that provides drip irrigation; and the heat exchanger transfers heat from the geothermal heated water flowing through the heat exchanger to the surface water flowing through the heat exchanger, producing a heated surface water stream that is transferred to the first and second conduits that deliver the heated water to the trellis.

2. The irrigation system of claim 1, further comprising a protective net coupled to the trellis, the protective net configurable in a first storage position and a second position in which the net is deployed to cover a plant attached to the trellis.

3. The irrigation system of claim 1, wherein the trellis is a component of a trellis system comprising at least one wire supported by a plurality of trellises.

4. The irrigation system of claim 3, wherein a protective net configured to cover a plant attached to a trellis is supported by a wire coupled to the trellis.

5. The irrigation system of claim 3, wherein the heated water spray delivered by the nozzle is distributed in a pattern substantially oriented along the wire.

6. The heated water distribution system of claim 3, wherein the heated water spray delivered by the nozzle is distributed in a pattern substantially perpendicular the wire.

7. The heated water distribution system of claim 3, wherein a nozzle is coupled to each trellis in the trellis system.

8. The heated water distribution system of claim 3, wherein the alternating trellises in the trellis system have a nozzle.

9. A trellis comprising: a post having at least one opening to receive at least a first wire; at least one crossbar coupled to the post, the crossbar having at least one opening to receive at least a second wire; a first conduit coupled to the post; a heated water stream flows through the first conduit into a means for delivering a heated water spray to an area surrounding the trellis; a second conduit coupled to the post, the second conduit configured to provide drip irrigation to a ground area surrounding the trellis; a geothermal heated water source; a surface water source; a heat exchanger; a first heat exchanger conduit system; a second heat exchanger conduit system; a first pump configured to extract geothermal heated water from a geothermal heated water source, conduct the geothermal heated water through the heat exchanger, and return the geothermal heated water to the geothermal water source, via the first heat exchanger conduit system; a second pump configured to extract water from a surface water source, conduct the surface water through the heat exchanger via the second heat exchanger conduit system, and conduct the surface water into the second conduit that provides drip irrigation; and the heat exchanger transfers heat from the geothermal heated water flowing through the heat exchanger to the surface water flowing through the heat exchanger, producing a heated surface water stream that is transferred to the first and second conduits that deliver the heated water to the trellis.

10. The trellis of claim 9, further comprising a protective net coupled to the trellis, the protective net configurable in a first storage position and a second position in which the net is deployed to cover a plant attached to the trellis.

11. The trellis of claim 9, wherein the trellis is a component of a trellis system comprising at least one wire supported by a plurality of trellises.

12. The trellis of claim 11, wherein a protective net configured to cover a plant attached to a trellis is supported by a wire coupled to the trellis.

13. The trellis of claim 11, wherein the heated water spray delivered by the nozzle is distributed in a pattern substantially oriented along the wire supported by a plurality of trellises.

14. The trellis of claim 11, wherein the heated water spray delivered by the nozzle is distributed in a pattern substantially perpendicular to the wire supported by a plurality of trellises.

15. The trellis system of claim 11, wherein a nozzle is coupled to each trellis in the trellis system.

16. The trellis system of claim 11, wherein alternating trellises in the trellis system have a nozzle.

17. A method for irrigating an area surrounding an agricultural trellis, the method comprising: conducting a heated water stream through a first conduit coupled to a trellis, the heated water stream further conducted into a nozzle coupled to the first conduit; delivering a heated water spray to an area surrounding the trellis via the nozzle; conducting an irrigation water stream through a second conduit coupled to the trellis, the second conduit configured to provide drip irrigation to a ground area surrounding the trellis; receiving geothermal heated water from a geothermal heated water source at a first heat exchanger input and receiving surface water from a surface water source at a second heat exchanger input; transferring heat from the geothermal heated water flowing through the heat exchanger to the surface water flowing through the heat exchanger to produce a heated surface water stream at an output of the heat exchanger, wherein the heat exchanger comprises: a first heat exchanger conduit system; a second heat exchanger conduit system; a first pump that extracts geothermal heated water from a geothermal heated water source, conducts the geothermal heated water through the heat exchanger, and returns the geothermal heated water to the geothermal water source via the first heat exchanger conduit system; and a second pump that extracts water from a surface water source, conducts the surface water through the heat exchanger via the second heat exchanger conduit system, and conducts the surface water into the first and second conduits that deliver heated water to the trellis.

18. The method of claim 17, further comprising deploying a protective net coupled to the trellis to cover a plant attached to the trellis.

19. The method of claim 17, further comprising supporting a wire between a plurality of trellises in a trellis system.

20. The method of claim 19, wherein the delivery of a heated water spray via the nozzle is distributed in a pattern substantially oriented along the wire supported by a plurality of trellises.

21. The method of claim 19, wherein the delivery of a heated water spray via the nozzle is distributed in a pattern substantially perpendicular to the wire supported by a plurality of trellises.

* * * * *